United States Patent [19]

Hentz

[11] 4,371,626

[45] Feb. 1, 1983

[54] METHOD OF UPGRADING CRUDE SODIUM BENTONITE

[75] Inventor: Donald A. Hentz, Spearfish, S. Dak.

[73] Assignee: Aurora Industries, Inc., Montgomery, Ill.

[21] Appl. No.: 253,787

[22] Filed: Apr. 13, 1981

[51] Int. Cl.$^3$ ............................ C09C 1/28; C09C 1/42
[52] U.S. Cl. .................................. 501/145; 252/449; 241/4; 106/291
[58] Field of Search ............... 501/145, 149; 252/449, 252/450; 241/4; 106/291

[56] References Cited

U.S. PATENT DOCUMENTS

| 2,231,328 | 2/1941 | Simmons | 255/1 |
| 3,700,474 | 10/1972 | Lang | 106/288 B |
| 4,125,411 | 11/1978 | Lyons | 106/291 |
| 4,254,565 | 3/1981 | Jenkins et al. | 37/195 |

FOREIGN PATENT DOCUMENTS 815924  7/1959  United Kingdom ............... 252/450

OTHER PUBLICATIONS

*The Condensed Chemical Dictionary*, p. 503, (Reinhold Publishing Corp., New York, 5th ed., 1956).
"Clays (Uses)", Kirk–Othmer, *Encyclopedia of Chemical Technology*, vol. 5, p. 577 (John Wiley & Sons, Inc., 2nd ed. 1964).

*Primary Examiner*—Mark Bell
*Attorney, Agent, or Firm*—Leydig, Voit, Osann, Mayer & Holt, Ltd.

[57] ABSTRACT

A method of upgrading crude sodium bentonite to improve its fluid loss properties, comprises subjecting the bentonite to shearing forces that are sufficient to increase the methylene blue uptake by the bentonite, and then drying and pulverizing the bentonite. The shearing forces are applied to the bentonite by extruding the bentonite while it has a moisture content between about 20 and 40 wt. %.

6 Claims, No Drawings

METHOD OF UPGRADING CRUDE SODIUM BENTONITE

DESCRIPTION OF THE INVENTION

The present invention relates to an improved method of preparing crude sodium bentonite for commercial use.

The term bentonite was first applied to a particular clay discovered near Fort Benton, Wyo. in the late nineteenth century. Today the term is generally used to refer to any clay having properties similar to the original bentonite product. Calcium is the predominant exchangeable cation in most natural bentonites. Deposits in Wyoming and in a region of Algeria are among the few in which sodium is the predominant cation. Bentonite in which sodium is the predominant exchangeable cation is referred to herein as sodium bentonite.

When it is mined, crude sodium bentonite ore has a moisture content in the range of about 30 to 40%. It is typically about 32%. Under present practice, bentonite ore is typically prepared for commercial use by subjecting it to a treatment comprised of the following steps:

(1) The crude bentonite ore is first placed on a stockpile with other bentonite ores and exposed to the environment. Equipment, such as a disc harrow, may be used to break down large chunks. During this step some of the moisture of the bentonite is removed by air drying, which facilitates the later step of oven drying the bentonite.

(2) Bentonite is taken from a stockpile, or a blend is made of bentonite taken from various stockpiles, and the bentonite is crushed to reduce it to small fragments.

(3) The crushed bentonite is then dried at carefully controlled temperatures. Excessive heat must be avoided because this can adversely affect the desired properties of the bentonite. After this step, the moisture content of the clay is in the range of about 5 to 15%. It is desirably about 8%. A bentonite product intended for use in drilling fluids should have a moisture content of 10% or less.

(4) The dried bentonite is finally pulverized in a roll mill to reduce the particle size to a fineness of about 80% through 200 mesh.

It is known that when sodium bentonite is dried at too high a temperature, its ability to absorb water and form dispersions having the desired properties is impaired and can be lost. In this regard, it has been observed that sodium bentonite products are frequently better able to quickly absorb water and form dispersions having the desired properties when the bentonite has been dried gradually, by exposing it to the wind and sun, rather than rapidly, by heating it in an oven or the like. Therefore, it is a customary practice to place crude sodium bentonite on open stockpiles for a period of time to remove at least a portion of the moisture before the bentonite is oven-dried. While it is on the stockpile the bentonite is broken down by disc harrowing or the like so as to promote gradual drying by exposing a greater surface area of the bentonite to the ambient conditions.

Major uses of bentonite include (1) use in drilling fluids, (2) use in foundry molding sands, (3) use in pelletizing ores, such as taconite ore, and (4) use in various civil engineering applications, such as use as an additive to cements, mortars, and concretes, use as a compacting agent for gravels and soils, and use in impermeabilization operations. The properties desired in bentonite vary depending on the contemplated use, and the properties of crude bentonite vary greatly from one ore to another. Efficient use of bentonite therefore typically requires selection and blending of various bentonite ores to provide a final product having the properties required for a particular use.

Bentonites suitable for use in drilling fluids are particularly valuable, because the ores required to make such products are relatively scarce. To be suitable for this use, a bentonite must, among other things, have good wall-building properties (as measured by the standard fluid loss test); provide a good yield (the yield being defined as the number of barrels of drilling fluid of a given viscosity obtained when a short ton of the bentonite is dispersed in fresh water); and be capable of producing a markedly thixotropic drilling fluid. The accepted tests for determining suitability of a bentonite for use in drilling fluids are defined in *API Specification for Oil-Well Drilling Fluid Materials,* API Spec 13A (7th Ed., May 1979), and *API Recommended Practice Standard Procedure for Testing Drilling Fluids,* API RP 13B (8th Ed., April 1980), which are incorporated by reference herein. These specifications were established on the basis of Wyoming bentonite, which is a sodium bentonite. Bentonites that contain a preponderance of calcium over sodium can sometimes be treated with sodium compounds, such as sodium carbonate (soda ash), to obtain a product having the required properties. In certain instances this treatment has been carried out by mixing the sodium carbonate with the crude calcium bentonite in a pug-mill extruder before the clay is dried. Such treatments are characterized by addition of substantial amounts of sodium carbonate or other sodium compounds to the bentonite.

Under present practice, sodium bentonite ores believed suitable for particular uses are segregated in separate stockpiles. Thus, stockpiles intended to supply drilling fluid grade bentonite, foundry-grade bentonite, and so forth, are separately maintained. In addition to these stockpiles, there are "special piles" for bentonite ores having exceptionally desirable or undesirable qualities. Bentonite from the "special piles" may be blended in minor quantities with bentonite from the other stockpiles to provide products having the required characteristics. In fact, blending of bentonites from various stockpiles is the rule rather than the exception because in practice it is nearly impossible to build a stockpile that precisely meets the requirements for a given particular use.

When sodium bentonite is dispersed in water, the properties of the dispersion typically change over a period of time before stabilizing. The time that it takes for a dispersion to display the ultimate potential of the bentonite greatly affects the acceptability of the bentonite for a given use.

For example, a given bentonite might produce a dispersion giving a viscometer dial reading of 30 at 600 rpm when the dispersion is tested 16 hours after is is prepared. This bentonite would therefore barely meet API Specification 13A, which requires a minimum 600 rpm reading of 30 for drilling-fluid-grade bentonite. If the same dispersion were tested after 48 hours, the viscometer reading might be considerably higher. This would show that the bentonite actually has much greater potential value. But because API Specification 13A requires the viscometer test to be carried out approximately 16 hours after the dispersion is made, the full potential of the bentonite could not be relied on when formulating a product for use in drilling fluids.

Thus, the time that it takes for a sodium bentonite to fully display its potential properties is an important characteristic of the bentonite. Users of bentonite are generally willing to wait only a short period of time for a dispersion to develop the desired properties.

Extremely good bentonite ores are a rare and irreplaceable natural resource. If they could be improved so that they develop their potential more quickly, or so that their properties are actually improved, then smaller amounts would be needed to bring up to standard the products in which the improved bentonites are used. And, the limited reserves of these rare ores could then be made to last longer. These reserves could also be extended by upgrading the lower grade bentonite ores with which the rarer ones are blended. Under present practice, the potential of many bentonite ores is being wasted.

When some sodium bentonites are dispersed in water the properties of the dispersion gradually deteriorate instead of improving. This is believed to be a result of impurities in the bentonite. The impurities are gradually released as the bentonite absorbs water and the platelets separate. When these bentonites are used in a blended product, the product must be formulated to exceed the required specifications so as to compensate for the deterioration of properties that will occur.

With the present practice of curing or aging bentonite stockpiles, attainment of the desired properties can take from six months to two years. Moreover, this practice requires a substantial investment, and the results are not predictable. When demand is high and stockpiles are depleted, bentonite producers are not even able to hold ore on stockpiles for the length of time necessary to realize the maximum improvement attainable by this practice.

Further, the quality of the bentonite taken from a stockpile is erratic, because each stockpile includes various ores that are added at various times, and the quality of each ore changes unpredictably. As a result, the quality of the bentonite being taken from a stockpile must be constantly monitored. This information determines the type of bentonite ore that is added to the stockpile, and is used to adjust blend proportions for products made using bentonite taken from the stockpile. Unanticipated changes in quality may necessitate alterations in mining plans and schedules, and this may occur at times when such changes are inconvenient and undesirable. Monitoring quality and effecting the necessary changes in mining plans, stockpile composition, and blend proportions are labor and equipment intensive, and are therefore expensive.

It is a primary object of the present invention to provide a method of upgrading crude sodium bentonite immediately, without the necessity of curing or aging the bentonite for prolonged periods in stockpiles.

One particularly important object of the invention is to provide such a process which significantly improves the fluid loss characteristics of most sodium bentonites. In this connection, a related object is to provide such a method which significantly increases the reserves of bentonite ores that can be used in drilling fluids.

Another object of the present invention is to provide a bentonite treatment method which provides an immediate assay of those bentonites which are not susceptible to upgrading.

It is a further object of the invention to provide a method of increasing the effective surface area of most bentonites in aqueous dispersions, as indicated by an increased uptake of methylene blue.

Still another object of this invention is to reduce the cost of processing bentonites for use in a variety of different applications. A related object is to provide an inexpensive and rapid method of curing bentonite ore immediately after it is mined.

Yet another object of the invention is to provide a method of upgrading the viscosity and water absorption properties of most sodium bentonites.

Other objects and advantages of the invention will be apparent from the following detailed description.

In accordance with the present invention, there is provided a method of upgrading crude sodium bentonite to improve its fluid loss properties, the method comprising subjecting the bentonite to shearing forces that are sufficient to increase the methylene blue uptake by the bentonite, and then drying and pulverizing the bentonite. The shearing forces are preferably applied to the bentonite by extruding the bentonite while it has a moisture content between about 20 to 40 wt. %.

This process has been found to immediately upgrade most sodium bentonites, thereby obviating the costly stockpile aging or curing process. Those bentonites that are not upgraded by the process of this invention are also not capable of being upgraded by stockpile curing; the extrusion process reveals this characteristic of the bentonite immediately, so that the cost of futilely stockpiling such bentonites can be avoided. Thus, the process of this invention has significant advantages with virtually any type of bentonite—it upgrades most bentonites, and provides immediate assessment of those that are not susceptible to upgrading.

One of the most important properties that is upgraded by the present invention is the "fluid loss" characteristic of the bentonite. The fluid loss specification is the most difficult specification the bentonite industry must meet, and this property of bentonite in drilling fluids has been extensively researched. At the present time, 15 cc. (using API Spec. 13A, Section 3.4) is the maximum allowable fluid loss for bentonites to be used in drilling fluids, and only a small percentage of crude bentonites measure up to this standard. With the present invention, however, bentonites exhibiting fluid losses as high as 20 cc. and above can be immediately upgraded to drilling fluid quality (see the specific working examples described below). Even more significant is the fact that many bentonites that could not previously be upgraded to drilling-fluid quality by stockpile curing, can now be upgraded to that level. Furthermore, crude bentonites which measure up to the drilling-fluid standard can also be upgraded so that smaller amounts of these relatively rare bentonites can be used to upgrade lower quality bentonites.

Other properties of sodium bentonites improved by the process of this invention are viscosity and water absorption properties of most sodium bentonites. These properties are generally not improved as universally as is the fluid loss characteristic, and can even be downgraded if the bentonite contains impurities such as calcium sulfate. Nevertheless, in the majority of bentonites tested thus far, one or both of these properties have been significantly improved by the process of this invention, as will be demonstrated by the working examples to be described below.

Any type of extruder may be used in practice of my invention, the only requirement being that it must subject the bentonite platelets to shearing forces sufficient to increase the methylene blue uptake, as will be discussed in greater detail hereinafter. I prefer to use an auger extruder, such as the anger extruder made by the Fate International Division of Plymouth Locomotive Works in Plymouth, Ohio. The extrusion pressure is not believed to be narrowly critical, but when low extrusion pressures are used, it may be necessary to extrude the crude bentonite more than one time to obtain the desired results.

The crude sodium bentonite can be extruded immediately after it is mined, or it can be held on a stockpile prior to extrusion. The moisture content of the bentonite when it is extruded should be within the range of about 20 to about 40 wt. %. When the moisture content of the bentonite is above 40 wt. %, it becomes too soupy for extrusion purposes. If the moisture content of the bentonite falls below 20 wt. %, it becomes difficult or impossible to extrude. It may be possible to add moisture to dry bentonite to increase its moisture content above 20 wt. % so that it can be extruded, but, this has not been successfully accomplished. Further, if it is possible, it would be costly because bentonite always contains much more than 20% moisture when mined, and a considerable amount of energy and/or time is required to reduce the moisture content below 20% in the first place. Thus in most cases it would be grossly inefficient to add back the moisture for extrusion purposes, thereby requiring further consumption of energy and/or time to remove the moisture again following extrusion of the bentonite. Accordingly, it is preferred to extrude the bentonite before drying it to a moisture content below 20%.

After the bentonite has been extruded, it can be dried by heating or by air drying on a stockpile, to bring the moisture content down to the desired final range of 5 to 15%. As mentioned previously, the desired final moisture content is usually about 8%. Though air drying takes more time and involves more handling of the bentonite to transport it to and from the stockpile, air drying generally produces a higher quality bentonite because it is more gradual and produces more uniform properties throughout the bentonite. This is in contrast to drying by heating in an oven or the like, which can lead to excessive drying of the exposed surfaces of the bentonite and insufficient drying of internal bentonite such as that located in the center of large chunks. Even when oven dried, however, bentonite processed in accordance with this invention exhibits significantly improved properties as compared with the crude bentonite prior to extrusion. Furthermore, it has been found that oven drying extruded sodium bentonite does not adversely affect fluid loss properties to the same degree as oven drying of unextruded sodium bentonite, regardless of whether it has been previously cured in a stockpile. Consequently, it is feasible to oven dry extruded bentonite having a moisture content as high as 35 to 40 wt. %, which has generally been considered unacceptable practice heretofore because of the adverse effect of prolonged oven drying on the fluid loss properties of the bentonite.

To facilitate drying, it may be advantageous to slice the extruded bentonite as it comes out of the extruder to expose a larger surface area from which the moisture can be withdrawn.

It has been discovered that extrusion of crude sodium bentonite results in an increase in the bentonite surface area when it is dispersed in water. The maximum surface area that can theoretically be presented by bentonite when it is dispersed in water is on the order of 800 $m^2/g$. Although this maximum is only approached and never reached in practice, it is desirable in most if not all applications for the bentonite surface area to be as large as possible. The surface area presented by a given bentonite can be determined using the methylene blue uptake test, which will be described hereinafter. As bentonite is presently mined and processed there is no notable change in methylene blue uptake from the time the bentonite is first tested as a fresh ore until it is sent out as a finished product. This is in contrast to bentonite processed in accordance with the present invention, which has been found to generally exhibit increased methylene blue intake, and in some cases the increase is very substantial. It therefore appears that the effect of extrusion is different from the effect obtained by working the bentonite on stockpiles.

TESTS

*Viscosity:* The viscosity characteristics of the bentonite samples referred to in the following examples were determined using the procedure described in section 3.4 of the American Petroleum Institute's *Specification for Oil-Well Drilling-Fluid Materials,* API Spec 13A (7th Ed., May 1979). A direct-indicating viscometer of the type described in Section 2.6 of API *Recommended Practice Standard Procedure for Testing Drilling Fluids,* API RP 13B (8th Ed., April 1980) was used. Viscometer dial readings at 300 and 600 rpm were recorded. Plastic viscosity (600-rpm reading minus 300-rpm reading) and yield point (300-rpm reading minus the plastic viscosity value) were calculated. For a bentonite to meet the requirements of API Spec 13A, the 600 rpm viscometer dial reading must be at least 30, and the yield point must not exceed 3×plastic viscosity.

*Fluid Loss:* Fluid loss properties of bentonite samples were determined using the procedure described in Section 3.4 of API Spec 13A. A filter press of the type described in Section 3 of API RP 13A was used. The volume of filtrate in cubic centimeters, to the nearest 0.1 cc, was recorded. For a bentonite to meet the requirements of API Spec 13A, the volume of filtrate must not exceed 15 cc.

*Water Absorption:* Water absorption characteristics were determined in accordance with the following procedure.

(1) A 2.00±0.025 gram sample of processed bentonite, previously dried at 105° C. until totally dry, was placed onto a tared filter paper (9 cm. hardened Whatman 50) within an inscribed 5 cm. circle. The weight of the sample of bentonite is hereinafter referred to as the "dry weight."

(2) The filter paper and bentonite were placed on a 12"×12"×1" Norton Medium Porosity Alumina plate. The plate was placed in a 14"×14"×2" pan filled with distilled water to ¼ inch from the top of the plate. The pan was covered with a glass cover, and the sample was allowed to absorb moisture for 18 hours.

(3) After 18 hours, the hydrated filter paper and bentonite were carefully removed from the plate and placed on a pre-weighed watch glass. The weight of the watch glass, hydrated paper and hydrated bentonite was then determined and recorded.

(4) To determine the weight of the hydrated filter paper alone, six papers from the same lot used in the absorbancy test were allowed to absorb water for 18 hours on the alumina plate, and the average weight of the hydrated filter papers was determined.

(5) The "wet weight" of the hydrated bentonite was calculated by subtracting the weight of the watch glass and the average weight of the hydrated filter paper from the measured weight of the watch glass plus hydrated filter paper plus hydrated bentonite sample.

(6) The water absorption (WA) value is calculated as follows:

$$WA = \frac{\text{Wet Weight} - \text{Dry Weight}}{\text{Dry Weight}} \times 100$$

*Methylene Blue Uptake:*

The methylene blue uptake test was carried out as follows:

(1) A 0.5 gram sample of dry bentonite was weighed.

(2) The sample was placed in a 125 ml erlenmeyer flask to which 50 ml of a 2% solution of tetrasodium pyrophosphate in deionized water was added.

(3) The erlenmeyer flask was placed in the stainless steel cup of an ultrasonic cleaning device (No. 536 "Ultrasonic M.B. Accessory" of Harry W. Dietert Co., Detroit, Mich.), and the cup was filled with water to which some detergent was added. The sample was then subjected to ultrasonic energy for 7 minutes.

(4) The flask was removed from the ultrasonic device, and a magnetic stirring rod was placed in the flask.

(5) While the sample was being stirred using the magnetic stirrer, a solution containing 0.01 meq/ml of methylene blue in water was added. An initial addition of methylene blue solution in an amount estimated to be 80% of the total amount of methylene blue solution required was added, and the sample was mixed for two minutes.

(6) A drop of the sample was placed on a piece of Whatman 50 hardened filter paper, which was suspended so that the area contacted by the drop was not in contact with any surface. If a blue-green halo formed, this indicated that the end point had been reached. If no halo formed around the dark central spot, an insufficient amount of methylene blue solution had been added.

(7) (a) If the end point was not observed, additional methylene blue solution was added before repeating the test for the endpoint. The methylene blue was added in 1.0 ml. aliquots, but the amount added before repeating the test for the endpoint is dependent upon the degree of accuracy sought. After each addition, the solution was stirred two minutes before the test for the halo was made. (b) If the end point was observed, the sample was stirred for an additional two minutes, and the test for the halo was repeated. If the halo was still observed, the test was complete. If it was not still observed, additional methylene blue solution was added.

(8) The result was reported in ml. of methylene blue solution, which is related to meq/100 g as follows:

$$2 \times \text{ml. of methylene blue solution} = \text{meq}/100 \text{ g.}$$

The end point in this spot test is believed to correspond to a coverage of the clay surface with methylene blue molecules, as discussed in P. T. Hang et al., "Methylene Blue Absorption by Clay Minerals. Determination of Surface areas and Cation Exchange Capacities (clay-organic Studies XVIII)" 18 *Clays and Clay Minerals* 203 (1970). The surface area per gram of clay is given by the equation:

$$M_f \times A_m \times 6.02 \times 10^{-2} \text{m}^2/\text{g}$$

Where $M_f$ is the meq of methylene blue per 100 g of clay required to cover the surface of the clay and $A_m$ is the area per molecule of methylene blue in $\text{Å}^2$. The value of $A_m$ is taken to be 130, which corresponds to the methylene blue molecules lying flat on the clay mineral surfaces. For present purposes, the surface area given by application of the foregoing equation is not particularly important. What is important is that the equation shows that the surface has increased if treatment of the clay causes the meq/100 g of methylene blue to increase.

EXAMPLE I

Twelve different crude sodium bentonite samples containing substantially all of their ore moisture were each split into two portions. One portion of each sample was broken into reasonably small lumps, and dried in an oven until the moisture content was approximately 8%, just as would be done in a plant. This portion of each sample was then ground to 80% minus 200 mesh, tested for viscosity, fluid loss, water absorption, and methylene blue uptake characteristics (with certain exceptions indicated by the entries "NT" in Table I).

The second portion of each sample was broken into reasonably small lumps, and then passed several times through a small auger-type meat grinder. After each second portion was extruded, it was dried in an oven until the moisture content was approximately 8%, using the same conditions used to dry the corresponding non-extruded portion. The second portion of each sample was then ground to 80% minus 200 mesh and tested for viscosity, fluid loss, water absorption, and methylene blue uptake characteristics (again with certain exceptions indicated by the entries "NT" in Table I).

The results of the tests are shown in Table I. In each case, the non-extruded portion of the sample is designated by a numeral with the suffix A, and the extruded portion is designated by the same numeral with the suffix B.

As shown in Table I, the fluid loss characteristics were improved for all the extruded samples tested for this property. Similarly, except for 8B, an increase in methylene blue uptake was observed for all the extruded samples tested for this property. The methylene blue uptake values for samples 8A and 8B are within the limits of experimental error of each other.

The viscosity values were increased in the extruded portions of all samples tested for this property, with the exception of samples 2, 9 and 10. In sample 2, there was no change.

The viscosity values for dispersions of the extruded samples 9B and 10B were lower than the values for the corresponding unextruded samples 9A and 10A. This was due to the fact that these particular bentonite samples contained substantial amounts of calcium sulfate, which was exposed more rapidly in the extruded samples 9B and 10B. The calcium sulfate was exposed more gradually in the non-extruded samples 9A and 10A, so that these products would not have performed as well in practice as they did during the viscosity test.

Water absorption was also increased in the extruded portions of all samples tested for this property.

EXAMPLE II

Four different crude sodium bentonite samples containing substantially all of their ore moisture were each split into two portions. One portion of each sample was dried in an oven until the moisture content was approximately 8%, just as would be done in a plant. This portion of each sample was then ground to 80% minus 200 mesh and tested for viscosity, fluid loss, and methylene blue uptake characteristics (with certain exceptions indicated by the entries "NT" in Table II).

TABLE I

| Bentonite Product | 600 rpm Viscometer Reading | 300 rpm Viscometer Reading | Plastic Viscosity cp. | Yield Point lb./100 sq. ft. | Fluid loss, cc. of filtrate | Water Absorption | Methylene Blue Uptake |
|---|---|---|---|---|---|---|---|
| 1A | 5 | 3 | 2 | 1 | 18.3 | 451 | 44 |
| 1B | 10 | 6 | 4 | 2 | 11.0 | 686 | 49 |
| 2A | 12 | 7 | 5 | 2 | 14.7 | 726 | 56 |
| 2B | 12 | 7 | 5 | 2 | 11.4 | 796 | 60 |
| 3A | 14 | 8 | 6 | 2 | 15.0 | 838 | NT |
| 3B | 18 | 12 | 6 | 6 | 11.8 | 845 | NT |
| 4A | 32 | 27 | 5 | 22 | 24.7 | NT | NT |
| 4B | 74 | 67 | 7 | 60 | 17.2 | NT | NT |
| 5A | 22 | 17 | 5 | 12 | 21.0 | NT | NT |
| 5B | 54 | 48 | 6 | 42 | 15.4 | NT | NT |
| 6A | 22 | 17 | 5 | 12 | 22.2 | NT | NT |
| 6B | 87 | 80 | 7 | 73 | 14.8 | NT | NT |
| 7A | 19 | 11 | 8 | 3 | 13.8 | NT | 54 |
| 7B | 23 | 14 | 9 | 5 | 10.0 | NT | 58 |
| 8A | 15 | 9 | 6 | 3 | 13.8 | NT | 45.0 |
| 8B | 24 | 15 | 9 | 6 | 11.6 | NT | 44.5 |
| 9A | 23 | 13 | 10 | 3 | NT | NT | 50 |
| 9B | 17 | 10 | 7 | 3 | NT | NT | 51 |
| 10A | 32 | 26 | 6 | 20 | NT | 596 | NT |
| 10B | 16 | 10 | 6 | 4 | NT | 450 | NT |
| 11A | NT | NT | — | — | NT | 689 | 49 |
| 11B | NT | NT | — | — | NT | 782 | 51 |
| 12A | NT | NT | — | — | NT | 644 | 59 |
| 12B | NT | NT | — | — | NT | 737 | 62 |

The second portion of each sample was passed several times through a de-airing auger-type extruder having a capacity of approximately 20 tons per hour (Type YF, Model 7 Junior, made by Fate International Division of Plymouth Locomotive Works, Plymouth, Ohio). The bentonite was extruded through a die having an opening approximately 4 inches by 8 inches in size. The extruded portion of each bentonite sample was then dried in an oven until the moisture content was approximately 8%, using the same conditions used to dry the non-extruded portion. Each extruded portion was then ground to 80% minus 200 mesh and tested for viscosity, fluid loss, and methylene blue uptake characteristics (again with certain exceptions indicated by the "NT" entries in Table II).

The results are shown in Table II. In each case, the sample portion processed without extrusion is designated by a numeral with the suffix A, and the sample portion processed with extrusion is designated by the same numeral with the suffix B.

As shown in Table II, the fluid loss characteristics were improved for all the extruded samples tested for this property. The methylene blue uptake value was improved for extruded bentonite sample 15B, but remained unchanged for sample 16B.

The viscosity values were increased in the extruded portions of all samples except sample 16, in which viscosity value for the extruded portion 16B was lower than for the unextruded portion 16A. Again, this resulted from the substantial amounts of calcium sulfate impurities which this sample contains.

As has been seen, the present invention provides a method of treating crude sodium bentonite so that it will more rapidly display the properties characteristic of the bentonite, and it will display generally improved properties. This process eliminates the necessity of keeping bentonite on stockpiles for long periods of time in order to maximize the utility of the clay.

TABLE II

| Bentonite Product | 600 rpm Viscometer Reading | 300 rpm Viscometer Reading | Plastic Viscosity cps. | Yield Point | Fluid loss, cc. of filtrate | Methylene Blue Uptake |
|---|---|---|---|---|---|---|
| 13A | 13 | 8 | 5 | 3 | 13.2 | NT |
| 13B | 17 | 11 | 6 | 5 | 11.5 | NT |
| 14A | 13 | 7 | 6 | 1 | 14.2 | NT |
| 14B | 17 | 10 | 7 | 3 | 11.2 | NT |
| 15A | 38 | 26 | 12 | 14 | 11.2 | 46 |
| 15B | 96 | 75 | 21 | 54 | 9.0 | 48 |
| 16A | 31 | 19 | 12 | 7 | NT | 54 |
| 16B | 23 | 15 | 8 | 7 | NT | 54 |

Although the process is particularly applicable to clays that have exceptional potential, but are slow to react, it is also applicable to clays of lesser quality.

I claim:

1. A method of upgrading crude sodium bentonite to improve its fluid loss properties, said method comprising subjecting the crude bentonite to shearing forces that are sufficient to increase the methylene blue uptake by the bentonite, and then drying and pulverizing the bentonite.

2. The method of claim 1 wherein the bentonite is subjected to said shearing forces by passing the bentonite through an auger extruder.

3. The method of claim 1 wherein the moisture content of the bentonite is between about 20 and about 40 wt. % when the bentonite is subjected to said shearing forces.

4. A method of upgrading crude sodium bentonite, said method comprising extruding the crude bentonite while its moisture content is between about 20 and about 40 wt. %, and then drying and pulverizing the bentonite.

5. The method of claim 4 wherein the extrusion of said bentonite subjects the bentonite to shearing forces sufficient to reduce the fluid loss and increase the methylene blue uptake of the bentonite.

6. A method of upgrading crude sodium bentonite having a fluid loss greater than 15 cc., as determined by the procedure of API Spec. 13A, *Specification for Oil-Well Drilling-Fluid Materials* (7th Ed., May 1979), said method comprising extruding said bentonite to subject it to shear forces sufficient to reduce said fluid loss below 15 cc., and then drying and pulverizing the bentonite.

* * * * *